(12) United States Patent
Daniels

(10) Patent No.: US 6,858,058 B2
(45) Date of Patent: Feb. 22, 2005

(54) FERTILIZER WITH EXCESS FREE SEQUESTERING AGENTS

(76) Inventor: Ralph S. Daniels, P.O. Box 1851, Sherman, TX (US) 75091-1851

( * ) Notice: Subject to any disclaimer, the term of this patent is extended or adjusted under 35 U.S.C. 154(b) by 0 days.

(21) Appl. No.: 10/096,004

(22) Filed: Mar. 12, 2002

(65) Prior Publication Data

US 2002/0088262 A1 Jul. 11, 2002

Related U.S. Application Data

(63) Continuation of application No. 09/695,364, filed on Oct. 24, 2000, now abandoned, which is a continuation of application No. 08/908,239, filed on Aug. 7, 1997, now abandoned, which is a continuation-in-part of application No. 08/899,740, filed on Jul. 24, 1997, now abandoned, which is a continuation-in-part of application No. 08/462,417, filed on Jun. 5, 1990, now abandoned, which is a continuation of application No. 08/235,655, filed on Apr. 29, 1994, now abandoned.

(60) Provisional application No. 60/037,760, filed on Feb. 13, 1997.

(51) Int. Cl.$^7$ .................................................. C05G 5/00
(52) U.S. Cl. ..................... 71/64.1; 71/1; 71/11; 71/32; 71/54; 71/48; 71/61
(58) Field of Search ........................... 71/1, 11, 32, 54, 71/61, 48, 64.1

(56) References Cited

U.S. PATENT DOCUMENTS

| | | |
|---|---|---|
| 3,245,776 A | 4/1966 | Rubin |
| 3,961,932 A | 6/1976 | Miller |
| 4,012,220 A | 3/1977 | Szalay et al. |
| 4,319,910 A | 3/1982 | Meyer |
| 4,395,273 A | 7/1983 | Leutner et al. |
| 4,425,149 A | 1/1984 | Kimbro |
| 4,952,229 A | 8/1990 | Muir |
| 5,159,094 A | 10/1992 | Thunberg |
| 5,171,349 A | 12/1992 | Vetanovetz et al. |
| 5,274,151 A | 12/1993 | Thunberg |
| 5,308,372 A | 5/1994 | Daniels |
| 5,372,626 A | 12/1994 | Zivion et al. |

OTHER PUBLICATIONS

Peters® Fertilizers, *Salesman's Manual*, Jul. 1977, pp. 8–9.
Peters® Fertilizers, *Technical Manual*, Jul. 1987, pp. 4–5, 142–143.
Conway et al. "Selecting and Using Chelating Agents" *Chemical Engineering* Mar. 1999.
Hampshire (W.R. Grace) "Chelating Agents" 1986 (brochure), no month.
Hampshire (W.R. Grace) "Chelating Agents" 1987 (brochure), no month.

*Primary Examiner*—Wayne A. Langel
(74) *Attorney, Agent, or Firm*—Welsh & Katz, Ltd.

(57) ABSTRACT

In a dry or concentrated liquid fertilizer when local water is added to dilute to a working concentration, the hardness components (e.g., Ca/Mg) in the local water react with the fertilizer components and begin to form low-solubility salts. These low-solubility salts form sludges in the working mixture and begin to scale up in the feeding tubes through which the liquid fertilizer is pumped. Furthermore, the fertilizer is deprived of the nutrient values of these low-solubility salts and, as a result, the economic value of the fertilizer is reduced. By adding excess sequestering agent(s) (i.e. above the amounts needed to dissolve the nutrients in the original fertilizer formulation) precipitation of the hardening components of the local water in the mixing tank, in the feeding tubes, and in the growing media is avoided, and previous scaling can be remedied.

4 Claims, 2 Drawing Sheets

FERTILIZER WITH EXCESS FREE SEQUESTERING AGENTS

CROSS-REFERENCE TO RELATED APPLICATIONS/INCORPORATION BY REFERENCE

This application claims benefit under 35 U.S.C. §119(e) of U.S. Provisional Application No. 60/037,760; filed 13 Feb. 1997.

This application is also continuation of application Ser. No. 09/695,364, filed 24 Oct. 2000, now abandoned, which was a continuation of application Ser. No. 08/908,239, filed 7 Aug. 1997, now abandoned, which was a continuation in part of application Ser. No. 08/899,740, filed 24 Jul. 1997, now abandoned, which was a continuation in part of application Ser. No. 08/462,417, filed 5 Jun. 1995, now abandoned, which was a continuation of application Ser. No. 08/235,655, filed 29 Apr. 1994, now abandoned.

This application is also ted to the following patents and applications, which are hereby incorporated by reference:

Daniels, U.S. Pat. No. 4,836,843, issued 6 Jun. 1989

Daniels, U.S. Pat. No. 5,308,372, issued 3 May 1994

Daniels, U.S. patent application Ser. No. 08/261,863, filed Jun. 17, 1994.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention relates to water-soluble macro and/or micronutrient fertilizers, to a process for their manufacture, and to their use for plant fertilization in agricultural, especially horticultural, settings.

BACKGROUND OF THE INVENTION

In agricultural use of fertilizers including more specifically, horticultural use, consideration must be given not only to the proper concentrations of "major" nutrients (macronutrients) such as nitrogen (N), phosphorus (P), potassium (K), but also to the situation-dependent need for calcium (Ca) and magnesium (Mg) and the so-called "trace" elements (micronutrients). These latter may include: Iron, manganese, zinc, cadmium, copper, aluminum, silicon, barium, titanium, molybdenum, boron, sodium, sulphur, cobalt, etc. on the rough order of 5–50 ppm.

In preparing a solid fertilizer mix or a concentrated or dilute liquid mix, the individual and mutual water solubilities of these various elements and their compounds must be considered.

To solubilize many of the micronutrients and to keep them in solution in the face of tendencies to precipitate in the presence of elements or compounds with which they may tend to form insoluble precipitates, resort has been made to enhancing the solubility by forming complexes or chelates with appropriate sequestering agents. These may be, for example, N-carboxylalkyl-amino acids, [such as the preferred ethylenediaminetetraacetic acid (EDTA)] and their alkali metal or ammonium salts.

Other complexing or chelating agents are well known in the art, such as those set out in Meyer, U.S. Pat. No. 4,319,910, issued Mar. 16, 1982 (see column 4, lines 21–63); Leutner et al., U.S. Pat. No. 4,395,273, issued Jul. 26, 1983; Kimbro, U.S. Pat. No. 4,425,149, issued Jan. 10, 1984; Rubin, U.S. Pat. No. 3,245,776, issued Apr. 12, 1966; all of which are hereby incorporated by reference).

Even with known use of sequestering agents to solubilize micronutrients, precipitation problems have been experienced, especially when the nutrient situation requires inclusion in the fertilizer of significant concentrations of calcium or magnesium and their compounds, and when a solid or concentrated liquid fertilizer is mixed with locally available water which happens to contain high concentrations of, e.g., calcium and/or magnesium ("hard" water).

In both cases, low solubility salts form, which result in sludge in the mixing vats and scale on the tubes and injectors which feed fertilizer to the plants. They also lock up the nutrient value of the compounds of the precipitate, reducing the economic value of the fertilizer.

Prior attempts to deal with their problems have involved feeding at separate times those nutrients which would precipitate, or attempting to control the pH at all stages to discourage precipitation. A relatively recent attempt to solve this long-standing problem by a variation of the latter approach, using very low pH, and no chelation, is disclosed in Vetanovetz and Peters, U.S. Pat. No. 5,171,349, which is hereby incorporated by reference. This appears to be the basis of Peters® EXCEL® water soluble fertilizers.

Since growers would generally prefer to apply all nutrients at once, and since control of pH is unlikely to be sustainable throughout the fertilizer application processes, there is a need for another approach.

The above problems are resolved in a novel and unobvious manner by the present invention.

Accordingly, a primary object of the invention is to provide a micronutrient and/or macronutrient fertilizer formulation which can resist precipitation and sludge formation, when challenged by such agents as added calcium or magnesium nutrients, or the calcium or magnesium of the local hard water used to dilute the fertilizer or which exists in the growing media.

It is a further object of the invention to minimize sludge in mixing vats and scale buildup in precision fertilizing drip tubes, injectors, and growing media, and to reduce such scale where it already exists.

Another object of the invention is to provide a fertilizer formulation which minimizes loss of nutrient value, and therefor economic value, resulting from use of locally available hard water for solution/dilution, or from the presence of hard water ions in the growing media.

These objects are achieved by the present invention, as taught to those skilled in the art by the present specification and as claimed below.

BRIEF SUMMARY OF THE INVENTION

In the present invention, fertilizer (concentrated or solid) which includes macronutrients and/or sequestered micronutrients, is provided with excess free sequestering agents (chelating or complexing agents) so that, when the fertilizer concentrate is diluted or dissolved with local water, the normally present hardness in the local water does not create a sludge which reduces the nutrient value of the resulting fertilizer. Furthermore, the presence of the excess sequestering agents stops formation of scale in drip tubing and injectors and also tends to remove any previously accumulated scale. Similarly, solubility challenges originating in the growing media can be overcome.

BRIEF DESCRIPTION OF THE SEVERAL VIEWS OF THE DRAWINGS

The character of the invention, may be better understood by reference to the accompanying drawings, in which:

FIG. 1 shows the sludge which poses problems in a preliminary mixing tank, and

FIG. 2 a cross-section on the line II—II of a drip tube, shows the buildup of scale in the lumen of the tube in the prior art;

DETAILED DESCRIPTION OF THE INVENTION

Figure 1:
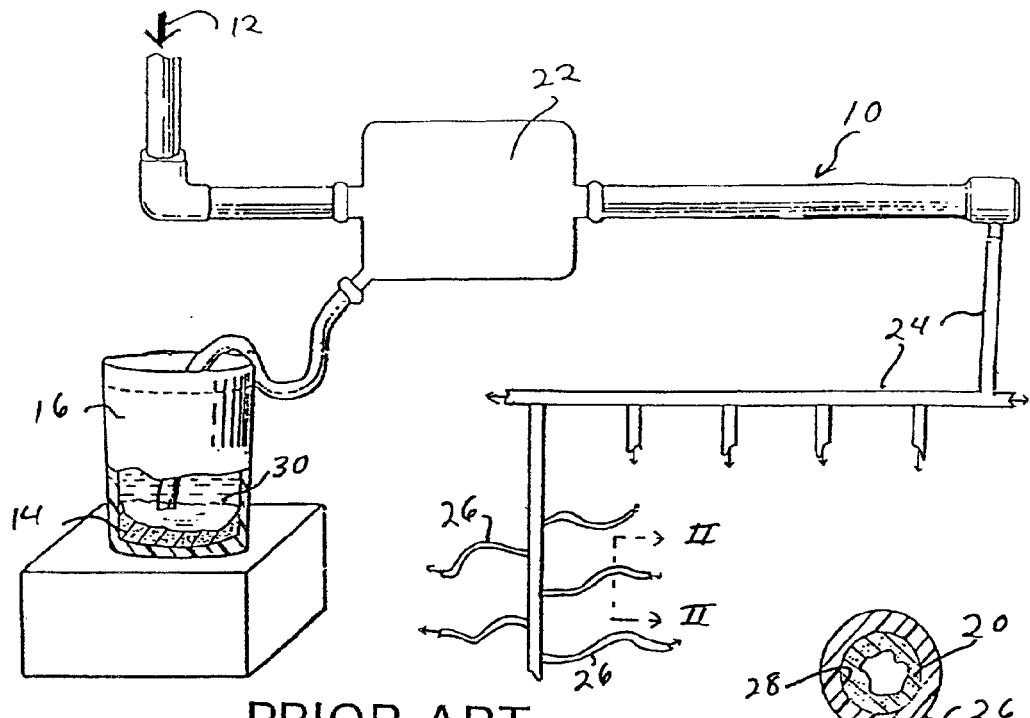
FIGS. 1 and 2 show a portion of a precision fertilizer delivery system as used in the commercial horticultural industry.
Figure 2:
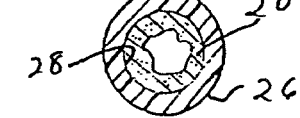
Figure 3:
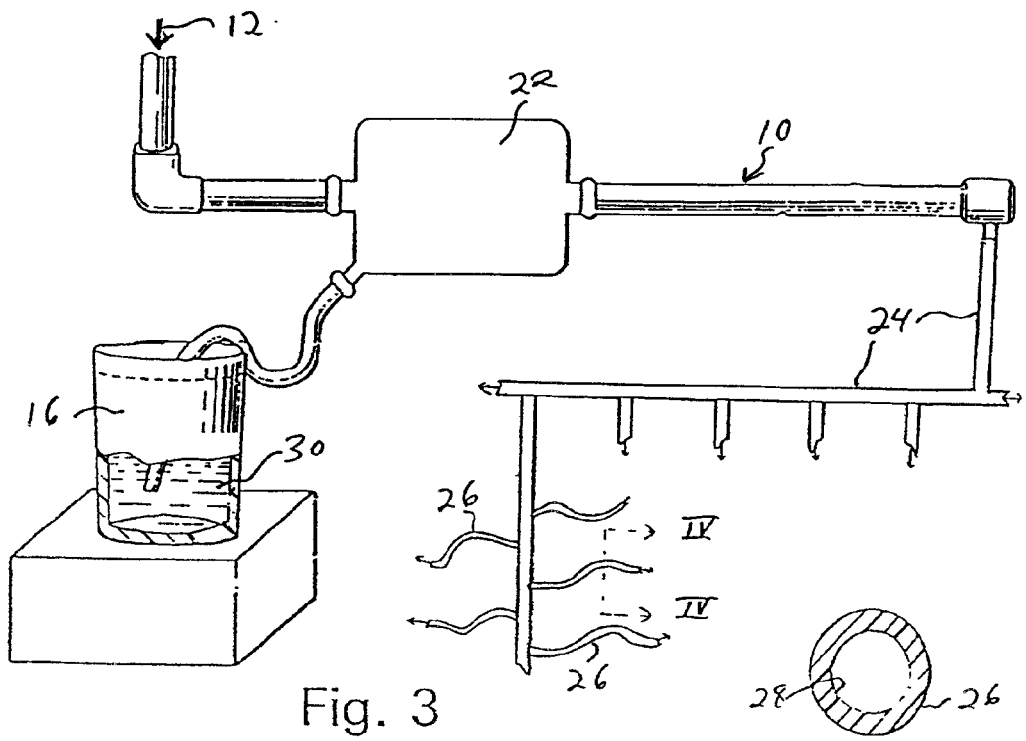
FIGS. 3 and 4 show the condition of the delivery system using the formulation and method of the present invention, illustrating the minimization of sludge in the mi tank and reduction of scale in the drip tubes.
Figure 4:
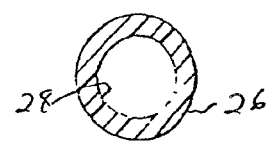

Referring to FIGS. 1 and 2, prior art fertilizer formulations have experienced solubility and precipitation problems in the delivery system 10 when solid fertilizer is dissolved (and when concentrated solutions are diluted) using local "hard" water sources 12. These sources 12 contain ions (e.g., Ca, Mg) which form low-solubility compounds with fertilizer components. Thus sludge 14 forms in the mining vat 16 and a scale 20 forms in the proportioner 22, intermediate piping 24, and most importantly in the narrow drip tubes 26 and injection syringes (not shown).

The narrowed lumen 28 of such a drip tube 26 is shown in the cross-sectional view of FIG. 2.

Whether from a dissolved solid or from a concentrated liquid, fully liquid fertilizer 30 would be decanted from the top of the vat to be fed to the plant feeding tubes. The sludge would normally be discarded, but certainly would not be used in the plant feeding tube systems. Its nutrient content is lost.

When a dry fertilizer formulation is made, it would be common practice to include sequestered (chelated) trace elements (micronutrients) in the mixture and the use of chelated trace elements would normally allow the trace elements to be dissolved at the time the dry fertilizer was being mixed with water. No one would have any reason to place significant additional amounts of "active" sequestering (chelating agents, such as EDTA (ethylenediaminetetracetate), in excess of the amount needed to just solubilize the micronutrients.

In fact, in part because of the expense of the most effective sequestering agents, the prior art teaches to avoid excessive amounts of such agents, (see Leutner et al., U.S. Pat. No. 4,395,273; column 3, lines 3–8) or, recently, attempts are made to avoid the need for chelating micronutrients at all by manipulating the acidity/basicity of the fertilizer formulation as taught in Vetanovetz and Peters, U.S. Pat. No. 5,171,349.

Thus, in the present invention, fertilizer (concentrated liquid or solid) is provided wit excess free chelating or complexing agents so that, when the fertilizer concentrate is diluted or dissolved with local water 12, the normally present hardness in the local water does not create a sludge 14 which reduces the nutrient value of the resulting fertilizer. Furthermore, the presence of the excess sequestering agents stops formation of scale on drip tubing 26 and also slowly removes any accumulated scale 20.

Additional micronutrients may be added as needed in the usual chelated form. Moreover, significant excess sequestering agent (over that needed to simply dissolve the micronutrients) is added to the fertilizer mix. This prevents precipitation of nutrients when a solution, especially a concentrated solution, is diluted with water.

It is also worth noting that the excess sequestering agents tend to descale any scaling which has formed in the feeding tubes as a result of other fertilizers having been used.

Thus, with excess chelate (more sequestering agent than is necessary to solubilize micronutrients in fertilizer):

1. The liquid fertilizer remains completely liquid,
2. The feeding tubes are far less subject to dogging since neither scales nor particles are normally present in the liquid fertilizer, and
3. The nutrient values of the fertilizer components and the hardening components in the local water remain available for plant feeding.

The preferred sequestering agent is an N-carboxyl alkylamino acid salt, such as a salt of EDTA (ethylene diamine tehran acetate) but many sequestering agents are suitably, as noted above, such as the following acids or, preferably, their alkali metal or ammonia salts, alone or in combination:

nitrilo-triacetic acid (NTA),
diethylenetriamino-pentaacetic acid (DPTA),
cyclohexane-1,2 diaminotetraacetic acid (CDTA)
hydroxyethyl-ethylenediaminotriacetic acid (HEEDTA),
derivatives of aspartic acid,
substituted amino-polycarboxylic acids, such as N-(2hydroxybenzyl)-substituted aminopolycarboxylic acids,
phosphonocarboxylic acids, for example 2-phosphobutane-1,2,4-tricarboxylic acid,
phosphoric acids such as 1,2-diaminocyclohexane-tetrakis-(methylene-phosphoric acid),
ligno-sulfonic acids and sulfonated tannins,
gluconic acid and glucoheptonic acid.

Figure 5:
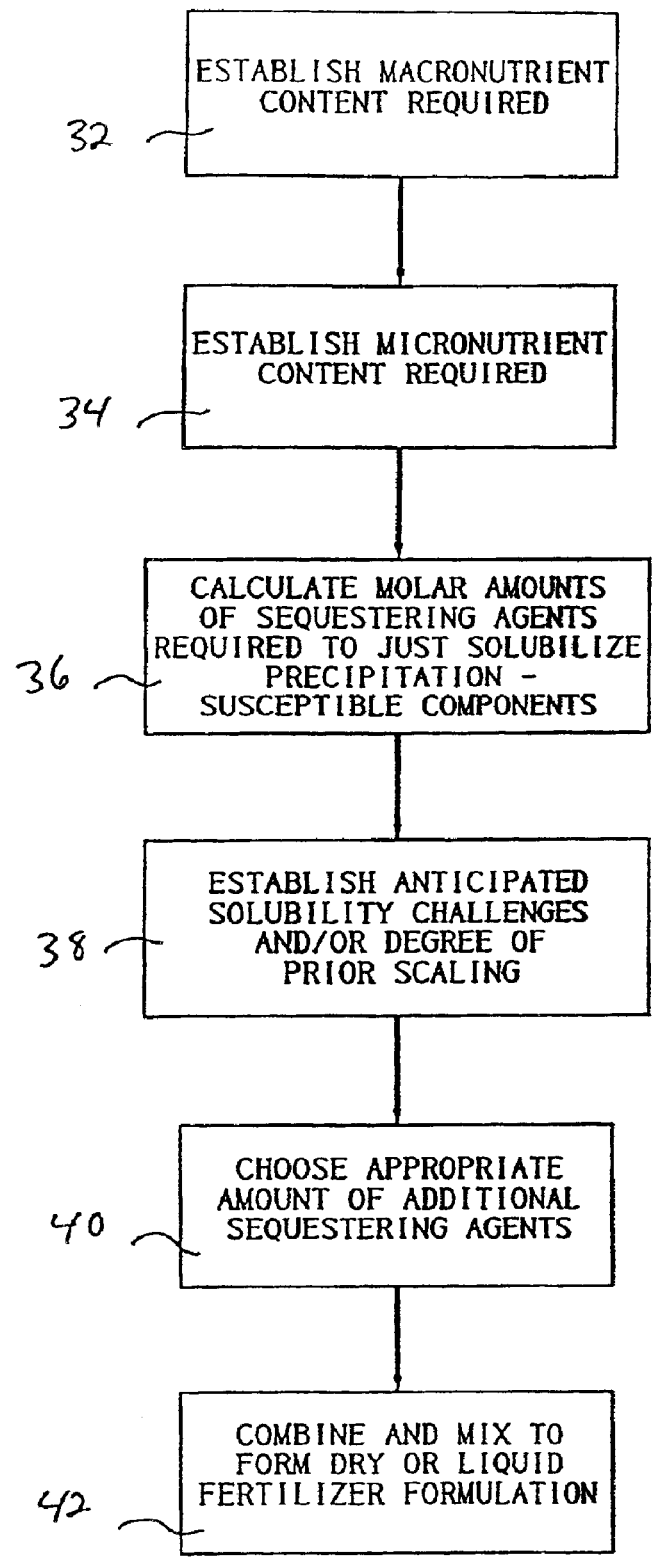
FIG. 5 illustrates the steps in producing the fertilizer formulation of the present invention.

A general procedure for manufacturing the fertilizer product of the present invention is shown in the steps of FIG. 5. This involves: establishing the major nutrient (macronutrient) requirements (if desired) for the anticipated application (32), establishing the requirements for trace elements (micronutrients) for the anticipated application (34), establishing the molar amounts of sequestering agent(s) to solubilize the micronutrients which need such sequestering at anticipated concentrations (36); establishing maximum anticipated calcium and magnesium or related solubility challenge from input as nutrients, as local hard water and as growing-media components and establishing the degree of previous scaling to be remedied (38), establishing appropriate amount of excess sequestering (complexing or chelating) agent(s) needed to meet these challenges (40), and combining and mixing the above as a dry or concentrated liquid fertilizer formulation (42). If the pH needs to be reduced, this is preferably done by $NH_3$ addition, which improves chelate activity and adds a macronutrient.

The solubility challenges to be taken into consideration include species deliberately added as nutrients, those in hard water used for dissolution and dilution, and those present in the soil or other growing media.

The resulting fertilizer does not require special handling compared with conventional formulations and results in reduced or eliminated: sludge formation; scaling in tubes and injectors; and nutrient value loss in the mixing vat, tubes, and growing media.

As noted, the actual amounts of nutrients and sequestering agents in the formulation will vary according to the anticipated nutrient needs, as well as application conditions and location.

In practice, for example, depending on the micronutrient needs of the specific crop or growing area, a micronutrient supplement (possibly to be added to a conventional macronutrient formulation) with excess chelating agent could be made up of the following components (by weight):

2% $MgSO_4 \times 7H_2O$

4% $MnSO_4 \times 4H_2O$

4% $FeSO_4 \times 7H_2O$

4% $ZnSO_4 \times 7H_2O$

1% $CuSO_4 \times 5H_2O$ 0.5% $H_3BO_3$ 0.01% $(NH_4)_6Mo_7O_{24} \times 4H_2O$

45% ethylene diamine—tetraacetic acid (EDTA)

balance water to 100%

The starting choice of micronutrients, their compound form, and their amounts will differ greatly depending on needs. The molar amount of chelating or complexing agent, however, should be significantly in excess of the amount needed to sequester the initial amounts of micronutrient ions, and will depend on the anticipated maximum solubility challenge and the existing degree of scaling in the delivery system.

In the limit, when no micronutrients are required, or no nutrients at all, the application of the calculated amount of sequestering agents by itself may be beneficial.

The usefulness of the present invention is enhanced when it is practiced in conjunction with the process of creating a fertilizer product from the acid water of an agricultural oil refining operation. Such a combination involves harvesting the oil-bearing vegetables from a growing area and extracting crude oil; separating refined vegetable oil from soapstock by treating the crude oil with base; treating the soapstock with an acid to form an acid oil phase and an acid water phase; separating the resulting acid oil from the resulting acid water; and treating the acid water by adding materials chosen from a nitrogen source, a phosphorous source, a potassium source, a micronutrients salt source, and a sequestered micronutrients source to make an appropriate fertilizer concentration for said plants. Excess sequestering agent, above the amount needed to solubilize said micronutrients, reduces any tendency for the components of the acid water and the added materials to precipitate in contact with hard water related ions.

Clearly, minor changes could be made in the form and construction of this invention without departing from its material spirit. Therefore, it is not desired to confine the invention to the exact form shown herein and described, but is desired to include all subject matter that properly comes within the scope claimed.

The invention having been thus described, what is claimed as new and desired to secure by Letters Patent is:

1. A liquid fertilizer containing nutrients including sequestered micronutrients, having excess free sequestering agent in a liquid solution with said nutrients, said excess free sequestering agents being above the amount needed to assure solubilization of said micronutrients, and sufficient to avoid precipitation and sludge formation.

2. A fertilizer formulation as recited in claims 1, wherein sufficient excess free sequestering agent is provided to prevent said micronutrients from precipitating in the environment of use.

3. Fertilizer formulation as recited in claim 1, wherein sufficient excess sequestering agent is provided to reduce scale in a delivery system.

4. A method of manufacturing a fertilizer formulation for given application, comprising the steps of:

(a) establishing a nutrient requirement for said application;

(b) establishing a requirement for sequestered micronutrients for said application;

(c) establishing a molar amount of sequestering agent(s) to assure solublization of said required sequestered micronutrients;

(d) establishing a maximum concentration level of said nutrients for precipitation of nutrients for said application and a concentration level of said nutrients for the initiation of scaling in a delivery system to be remedied;

(e) establishing the amount of excess free sequestering agent needed to avoid said precipitation or remedy said scaling;

(f) combining and mixing the established amount of nutrients and sequestering agent(s) as a dry or liquid fertilizer formulation; and (g) adding to water to form a liquid mixture.

* * * * *